SOCKETED SCREW HEAD WITH UNIFORMLY OFFSET GROOVES
Original Filed March 16, 1955
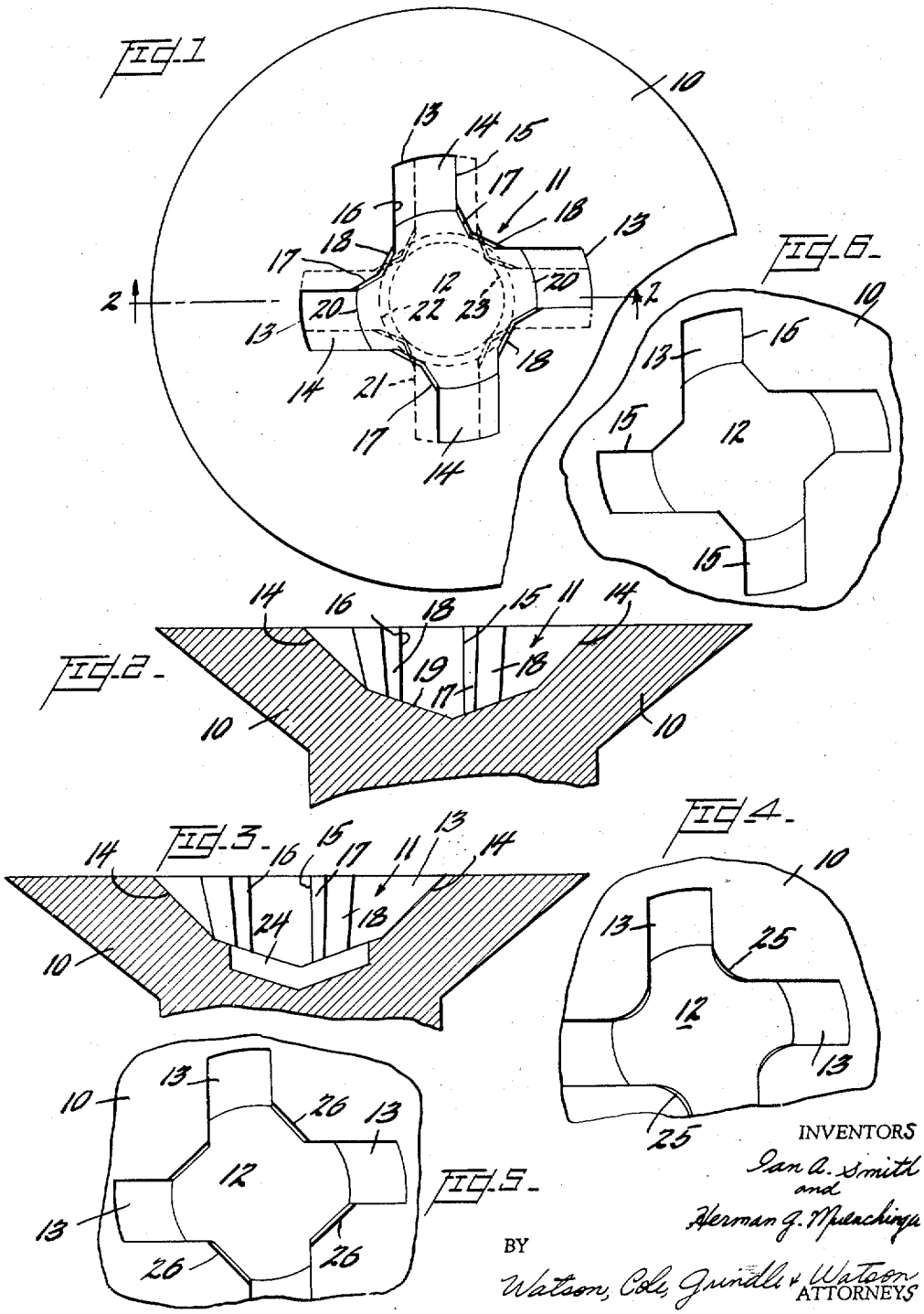
INVENTORS
Ian A. Smith
and
Herman G. Meaching
BY
Watson, Cole, Grindle & Watson
ATTORNEYS United States Patent Office Re. 24,878
Reissued Sept. 27, 1960

24,878

SOCKETED SCREW HEAD WITH UNIFORMLY OFFSET GROOVES

Ian A. Smith, Willimantic, and Herman G. Muenchinger, Chaplin, Conn., assignors to American Screw Company, Willimantic, Conn., a corporation of Rhode Island Original No. 2,847,894, dated Aug. 19, 1958, Ser. No. 494,726, Mar. 16, 1955. Application for reissue Jan. 18, 1960, Ser. No. 3,218

18 Claims. (Cl. 85—45)

Matter enclosed in heavy brackets [ ] appears in the original patent but forms no part of this reissue specification; matter printed in italics indicates the additions made by reissue.

This invention relates to threaded fasteners, and more particularly to recessed head screws, bolts and the like.

Threaded fasteners having recessed or socketed heads, as distinguished from slotted heads, have come into very widespread use over the last several decades due in large part to the development of the so-called "Phillips" recess, and the proven superiority of recessed head screws and other fasteners, particularly in manufacturing and assembly operations involving large quantities of such fasteners and likewise involving the use of power drivers. The development in question has resulted in the provision of fasteners having improved torque capacity over slotted screws and the like, which fasteners may be driven much more quickly and efficiently, and with much less hazard to the work into which they are driven. However, the demand for still greater torque capacity (ability to be more securely tightened, i.e. driven home with greater force), continues to be felt, and thus the research for an improved tool recess continues.

The recess of the "Phillips" type cannot be increased in size or penetration beyond a certain proportion with respect to the size of the fastener, because of the relative proportions of the recess itself. That is, when the overall size of the recess is increased beyond a certain extent, the central portion of the recess penetrates below the depth of the fastener head and into the shank, thus undesirably weakening the screw at an already critical point, namely, the junction of the head and shank.

Another characteristic of the Phillips recess which limits its usefulness is that, due to its symmetrical design, it is rather susceptible to the unfavorable effect known as "rock-out," that is, the tendency of the driving tool to incline or rock laterally along one or the other of the crossed groove axes, and thus dislodge itself from the recess, or at least depart sufficiently from its proper coaxial relationship with the fastener so that difficulty is encountered in properly driving the fastener, possible damage to the fastener, the work, or both, resulting from this condition. Attempts to develop a "Phillips" recess of wider and shallower proportions, in order to overcome the effect noted in the preceding paragraph, have the result of increasing the "rock-out" characteristic of the recess which thus becomes a limiting factor. However, the "rock-out" effect is not limited to screw recesses of the so-called Phillips type, but is encountered to a greater or lesser degree in driving screws having various types of recesses, slots or other tool-engaging means. It is caused by at least two factors which, though always present, have become of increasing importance due to the large increase in applied torque which has been employed in recent times. The two factors in question are (1) the inevitable loose fit of driver and recess, due to manufacturing tolerances and which, also, is to a degree indispensable in order to facilitate entry of the driver into the recess; and (2) deflection of driver wings and groove walls. This deflection, which of course has a more pronounced effect on the driver wings than on the groove walls, is a function of applied torque. In earlier times when the screws were driven by the use of conventional hand screw drivers or power drivers of relatively low torque capacity, the said deflection effect was not of serious proportions. However, with the use of increased applied torque by means of power drivers, and particularly since it has become the practice, in many instances, to apply the final tightening effect through a "torque wrench," deflection of the driver wings has become a serious problem, particularly as it affects the aforesaid "rock-out" characteristic.

The comparatively loose fit of the driver bit in the screw recess aggravates the rock-out problem no matter what the form of the screw recess and, as mentioned above, such loose fit is inevitable in commercial practice. Moreover, the tendency in screw recess development has been toward shallower and still shallower recesses. Any recess, if deep enough, will substantially eliminate the rock-out problem, but it is impractical for various reasons to make and use screws having recesses which are deep enough to serve this purpose.

Driver wing deflection takes the form of a spiral deformation of the wings. That is, since the upper edges of the wings are integral with the shank of the driver bit the wing deflection, measured in degrees, increases downwardly toward the tip of the driver bit. The result is a spiral deformation of the wings, causing a reaction the axial component of which is a force tending to throw the driver out of the recess, and which also enhances the rock-out effect.

The torque used in driving recessed head screws has been increased, in the last decade, by at least ten times, and characteristics which were formerly of little or no importance have become critical. One of these is the rock-out characteristic discussed above, and since the final tightening is now frequently performed by means of the aforesaid "torque wrench" which applies all of the torque on one side of the screw, giving an unbalanced force on the driver, the danger of rock-out is vastly increased.

The torque capacity of the screw and driver combinations heretofore known has also been subject to limitation by reason of the design of the driver tip, which is of course substantially complementary to the screw recess. If the recess has a sufficiently high torque capacity, the overall capacity of the combination may depend upon the capacity of the driver, failure of the latter frequently occurring due to an inadequate strength through the central portion of the driver tip, corresponding to the central portion of the screw head recess.

The general object of the present invention is the provision of a threaded fastener having a tool-receiving recess designed to impart a maximum torque capacity to the screw itself, while at the same time eliminating the aforesaid "rock-out" characteristic, and also permitting the use of a stronger driving tool, all of which factors result in a substantial increase in the overall torque capacity of the screw and driver combination, and increase its usefulness.

Another object is the provision of a fastener having a recess extending into its upper end along its longitudinal axis and comprising a central portion and a plurality of grooves extending outwardly therefrom, which grooves extend generally radially but are displaced *in the same rotative sense* [rearwardly (relative to the driving direction)] from true radii, so that *one* [the driving] wall of each groove lies on or near a true radius while the opposite wall of the groove lies at a substantial distance from the said radius. The grooves are staggered, and the walls of the central portion connecting adjacent grooves are thus rendered asymmetrical, so as to completely eliminate any tendency of the tool to rock sidewise out of the recess.

A further object of the invention is the provision of a threaded fastener having a recessed head, the recess of which is designed so that for a given torque capacity of the fastener, a tool having larger torque capacity is accommodated, thus increasing the overall capacity of the screw and driver combination. In other words, for a recess having a given torque capacity, the physical diameter of the central portion is increased, so that a stronger driver may be used.

Another object is the provision of a threaded fastener having a recess of the type described above, the substantially radial grooves being arranged in angularly spaced, oppositely directed pairs, the grooves of each pair being staggered or displaced with respect to each other so as to eliminate "rock-out" and permit the use of a driver having a larger central portion.

Another object is the provision of a fastener having a recess such as described above, and provided also with a pilot recess at the bottom of the driving recess, as a further insurance against "rock-out."

Additional objects are the provision of fasteners having recesses similar to that described above, but differing in the configuration of the walls of the central recess portion.

Other and further objects, features and advantages will be apparent from the description which follows, read in connection with the accompanying drawings in which:

Figure 1 is a plan view of the head of a fastener provided with a recess according to the present invention, the conventional recess now in widespread use being indicated in dotted lines for ease of comparison;

Figure 2 is a vertical section on line 2—2 of Figure 1;

Figure 3 is a view similar to Figure 2, but illustrating a modification containing an additional feature; and Figures 4, 5 and 6 are partial plan views illustrating further modifications of the recess of Figure 1.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to Figures 1 and 2 of the drawings, the screw head 10 is provided, centrally thereof, with a recess designated generally by the reference numeral 11, which recess consists of a central portion 12 and four generally radially extending grooves 13 which terminate substantially inwardly of the outer periphery of the screw head. Each groove 13 is bounded by a bottom wall 14 and side walls 15 and 16. [For convenience, the side wall 15 disposed on the clockwise side of the groove will be hereinafter called the "driving wall" of the groove.] The [driving] wall *15* of each groove is connected with the wall 16 of the adjacent groove through the intermediary of walls 17 and 18 which bound the central portion 12 of the recess and which intersect each other, and the adjacent groove walls, at obtuse angles. The bottom walls 14 of the respective grooves 13 intersect the shallow conical bottom wall 19 of the central portion 12 along arcuate lines 20, while the walls 17 and 18 of the central portion 12 also intersect the bottom wall 19 along their lower edges.

The groove walls 15 and 16 have been illustrated as vertical, that is as occupying planes parallel to the longitudinal axis of the screw, while the walls 17 and 18 of the central recess portion 12 have been illustrated as having a slight vertical taper or upward flare. This particular characteristic or arrangement is not critical, the presence or absence of slight amounts of vertical taper in the walls of the grooves, or of the central portion of the screw recess, depending upon the design of the header punch used in producing the recess, the composition and temper of the metal stock of which the screw or other fastener is formed and other factors not necessary to detail. As is well known, even when the header punch is formed with vertical or non-tapering wing walls and central nib surfaces, the recess produced by the punch, at least in certain materials, will have some degree of vertical taper. Also, this vertical taper may be somewhat reduced, or perhaps eliminated, by the impact of the end surface of the punch, surrounding the punch nib, upon the head of the fastener at the end of the forward movement of the punch. For present purposes, the groove side walls 15 and 16, as well as the walls 17 and 18 of the central recess portion 12, should be substantially vertical, but not necessarily entirely without vertical taper.

The groove side walls 15 and 16 [, and particularly the driving walls 15,] are substantially without horizontal taper. That is, the walls 15 and 16 are preferably parallel to each other and to a true radial plane extending into the groove or coinciding with [the driving] *one* wall *thereof* [15 (Figure 6)].

It will be seen that the grooves 13 of any oppositely directed pair are staggered or mutually disaligned. For this reason, it will be readily understood that when a driving tool having a complementary shape is seated in the recess 11, *with the customary clearance,* that tool will necessarily be substantially coaxial with the screw shank, and will not be subject to rocking or inclining laterally with respect to the recess 11. In effect, the tool will be locked in the recess against any relative movement except withdrawal in a substantially axial direction. This is not true of the standard "Phillips" recess of which the outline is illustrated in dotted lines at 21 in Figure 1. The recess 21 being symmetrical with respect to planes containing the screw axis and passing centrally through the respective grooves, or midway therebetween, a tool of complementary shape, *seated in the recess 21 with the customary clearance,* may easily be rocked or inclined laterally, in the direction of either pair of grooves, or at 45° thereto, until the tool is unseated from the recess. If power is applied while the tool is in a position substantially inclined to the screw axis, the tool may jump out of the recess, injuring the recess and marring the work, or the recess may be reamed, or the tool may be broken. These damaging results cannot occur with the recess of the present invention. Moreover, as illustrated in Figure 1, offsetting of the grooves 13 in accordance with the invention results in the enlargement of the horizontal section of the central recess portion 12, as illustrated by the fact that the dotted circle 22, which is just tangent to the intersections of the central recess walls 17 and 18, is of substantially greater radius than the dotted circle 23 inscribed within the comparable area of the conventional recess 21. It is thus apparent that a driver having a shape complementary to the recess of the present invention could be made substantially stronger than the equivalent driver shaped to conform to the recess 21.

Although the wall 15 is of somewhat less area than the corresponding wall of a conventional recess 21 having the same overall width, the driving torque which can be transmitted through the walls 15 is as great as, or greater than, the torque which can be transmitted through the corresponding walls of the recess 21. The explanation of this functional characteristic of the present [recess] *embodiment* lies partly in the fact that a more powerful driver is used, and partly in the fact that the [driving] walls 15 may be made coincident with a true radial plane, [and in any case are] *or may be* located much closer to a true radial plane than are the corresponding walls of a conventional recess 21. The force transmitted by the driver, therefore, is much more evenly distributed over the [driving] wall 15 than over the corresponding wall of a conventional recess 21, the force being largely concentrated, in the latter case, toward the outer boundary of the [driving] wall and of the corresponding wing wall of the driver. It is therefore evident that a smaller crushing force, per unit of area, is acting upon the [driving] walls 15 of the present recess than that which acts upon the outer areas of the [driving] *corresponding* walls of the conventional recess 21, when the same total torque is applied in each case.

As illustrated in Figure 3, the anti-rock-out characteristic of the recess may be further enhanced by providing a cylindrical extension 24 at the bottom of the recess 11, to receive and closely engage a complementary projection formed on the end of the driving tool.

The recesses illustrated in Figures 4 and 5 are similar to that shown in Figure 1, except that the walls 17 and 18 of Figure 1 are replaced by a single curved wall 25 (Figure 4) or a single flat wall 26 (Figure 5). In the form illustrated in Figure 5, the cross-sectional area of the central recess portion 12 is even larger than in the case of Figure 1 and Figure 4.

Figure 6 illustrates an embodiment in which the [driving] walls 15 lie on true radial planes, which is the preferred arrangement [insofar as the driving walls are concerned]. With this arrangement [of driving walls], the walls of the central recess portion may be arranged in either of the several ways illustrated in Figures 1, 4 and 5, and the cylindrical extension or pilot recess 24 may be employed or not, as desired.

Although for purposes of comparison the recess of the present invention has been illustrated as bearing the same proportion to the screw size, in width, as the conventional recess 21, obviously the recess of the invention can be made considerably wider in proportion to the screw head, since it is shallower in design. That is, it is possible to increase the overall size of the improved recess, relative to the fastener in which it is used, without penetrating the shank of the fastener and thus weakening the fastener at the junction of the head and shank. On the same reasoning a fastener having a recess of the improved design, but of the same overall width as the conventional recess, is a considerably stronger screw, and at the same time, may be used with a driver which is itself considerably stronger, in view of the larger central cross-sectional area which it may have.

The expression "vertical medial plane" is intended to signify a plane which is substantially parallel to the screw axis and contains (1) the midpoint of a line joining the intersections of the respective groove walls 15 and 16 with the outer edge of the bottom wall 14, and (2) the midpoint of a line joining the intersections of the respective groove walls with the inner edge of the bottom wall.

If the walls 15 and 16 are parallel or have equal and opposite horizontal and/or vertical tapers, the vertical medial plane of each groove will be exactly parallel to some radial plane (i.e. a plane containing the screw axis). If the respective walls 15 and 16 differ in vertical taper the "vertical medial plane" will have a slight inclination to the screw axis and thus to any radial plane, while if the walls 15 and 16 differ in horizontal taper, but not in vertical taper, the "vertical medial plane" will nevertheless be parallel to a true radial plane. In the appended claims the "true radial plane" to which the side walls of each groove are referred is that radial plane to which the "vertical medial plane" is most nearly parallel.

Having thus described the invention, what is claimed as new and desired to be secured by Letters Patent is:

1. A screw having a recess extending into its upper end along its longitudinal axis and comprising a central portion having a concave bottom in the general form of an inverted cone and at least three angularly equidistant grooves extending outwardly therefrom and terminating substantially inwardly of the outer periphery of said upper end, each said groove having a substantially vertical [driving] *first* side wall, an opposite substantially vertical side wall, and a bottom wall intersecting said respective side walls, said grooves extending generally radially and having their bottoms inclined upwardly and outwardly, said grooves having their vertical medial planes substantially parallel to, but displaced *in the same relative sense* from, true radial planes, [the driving] *one side* wall of each said groove lying closer to said respective substantially parallel true radial plane than does the opposite wall of the same groove.

2. A screw having a recess as defined in claim 1, said *side* [driving] walls lying *closer to said true radial planes being disposed* in planes parallel to said true radial planes.

3. A screw having a recess as defined in claim 1, said *side* [groove] walls lying in planes parallel to said true radial planes.

4. A screw having a recess as defined in claim 1, said *side* [driving] walls lying *closer to said true radial planes being disposed* in said radial planes.

*5. A screw having a recess as defined in claim 4, said side walls disposed in said true radial planes being those walls to which torque is applied in driving said screw into the work.*

*6* [5]. A screw having a recess as defined in claim 1, adjacent walls of adjacent grooves being connected by surfaces of said central portion which surfaces are arranged asymmetrically with respect to any plane containing said screw axis.

*7* [6]. A screw having a recess as defined in claim [5] *6*, said central portion surfaces comprising a plurality of plane surfaces between each two grooves, said plane surfaces joining each other and said groove walls at obtuse angles.

*8* [7]. A screw having a recess as defined in claim [5] *6*, said central portion surfaces comprising a single plane surface between each two grooves.

*9* [8]. A screw having a recess as defined in claim [5] *6*, said central portion surfaces comprising a single curved surface between each two grooves.

*10* [9]. A screw having a recess as defined in claim 1, said central portion having a cylindrical extension at the bottom, said cylindrical extension being concentric with said longitudinal screw axis.

*11* [10]. A screw having a recess as defined in claim 1, said [driving] *first side* walls lying substantially in said radial planes, and said opposite groove walls being substantially parallel to said radial planes.

*12* [11]. A screw having a recess *as defined in claim 1,* [extending into its upper end along its longitudinal axis and comprising a central portion having a concave bottom in the general form of an inverted cone and grooves extending outwardly therefrom and terminating substantially inwardly of the outer periphery of said upper end, each said groove having a substantially vertical driving side wall, an opposite substantially vertical side wall, and a bottom wall intersecting said respective side walls, said grooves extending generally radially and having their bottoms inclined upwardly and outwardly, said grooves having their vertical medial planes substantially parallel to, but displaced from, true radial planes, the driving wall of each said groove lying closer to said respective substantially parallel true radial plane than does the opposite wall of the same groove.] said grooves being arranged in angularly spaced, oppositely directed pairs.

[12. A screw having a recess as defined in claim 11, said driving walls lying in planes parallel to said true radial planes.]

[13. A screw having a recess as defined in claim 11, said groove walls lying in planes parallel to said true radial planes.]

[14. A screw having a recess as defined in claim 11, said driving walls lying in said radial planes.]

[15. A screw having a recess as defined in claim 11, adjacent walls of adjacent grooves being connected by surfaces of said central portion which surfaces are arranged asymmetrically with respect to any plane containing said screw axis.]

[16. A screw having a recess as defined in claim 15, said central portion surfaces comprising a plurality of plane surfaces between each two grooves, said plane surfaces joining each other and said groove walls at obtuse angles.]

[17. A screw having a recess as defined in claim 15, said central portion surfaces comprising a single plane surface between each two grooves.]

[18. A screw having a recess as defined in claim 15, said central portion surfaces comprising a single curved surface between each two grooves.]

[19. A screw having a recess as defined in claim 11, said driving walls lying substantially in said radial planes, and said opposite groove walls being substantially parallel to said radial planes.]

*13. A screw having a recess as defined in claim 1, said side walls lying closer to said true radial planes than do said opposite side walls being those walls to which torque is applied in driving said screw into the work.*

*14. A screw having a recess as defined in claim 12, said side walls lying closer to said true radial planes than do said opposite side walls being those walls to which torque is applied in driving said screw into the work.*

*15. A screw having a recess as defined in claim 12, said grooves being angularly spaced at 90° intervals.*

*16. A screw having a recess as defined in claim 15, said side walls lying closer to said true radial planes than do*

*said opposite side walls being those walls to which torque is applied in driving said screw into the work.*

*17. A screw having a recess as defined in claim 15, said side walls lying closer to said true radial planes being disposed in said radial planes.*

*18. A screw having a recess as defined in claim 17, said side walls disposed in said true radial planes being those walls to which torque is applied in driving said screw into the work.*

References Cited in the file of this patent or the original patent

UNITED STATES PATENTS

| | | |
|---|---|---|
| Re. 15,483 | Stirling | Oct. 31, 1922 |
| 101,207 | Angar | Mar. 29, 1870 |
| 1,797,390 | Wood | Mar. 24, 1931 |
| 1,956,963 | Salem | May 1, 1934 |
| 2,216,382 | West | Oct. 1, 1940 |
| 2,304,704 | O'Leary | Dec. 8, 1942 |
| 2,445,978 | Stellin | July 27, 1948 |

FOREIGN PATENTS

| | | |
|---|---|---|
| 3,825 | Great Britain | Nov. 3, 1875 |